Feb. 19, 1924.
C. J. WALKER
ELECTRIC RIVETER
Filed March 31, 1922
1,483,919
2 Sheets-Sheet 1
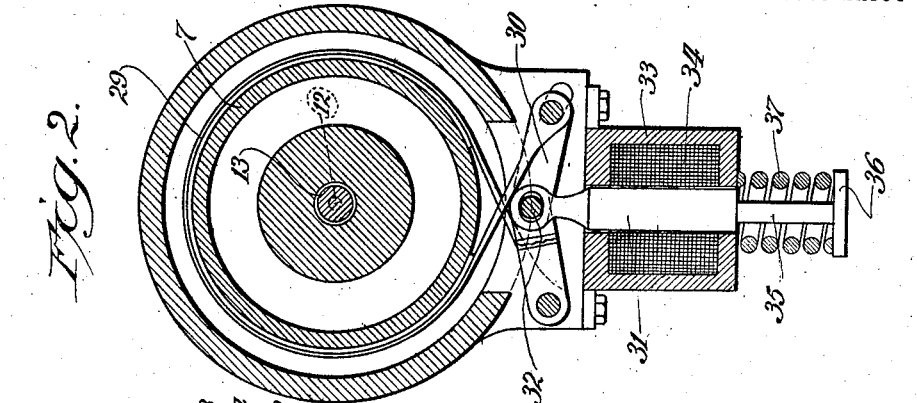
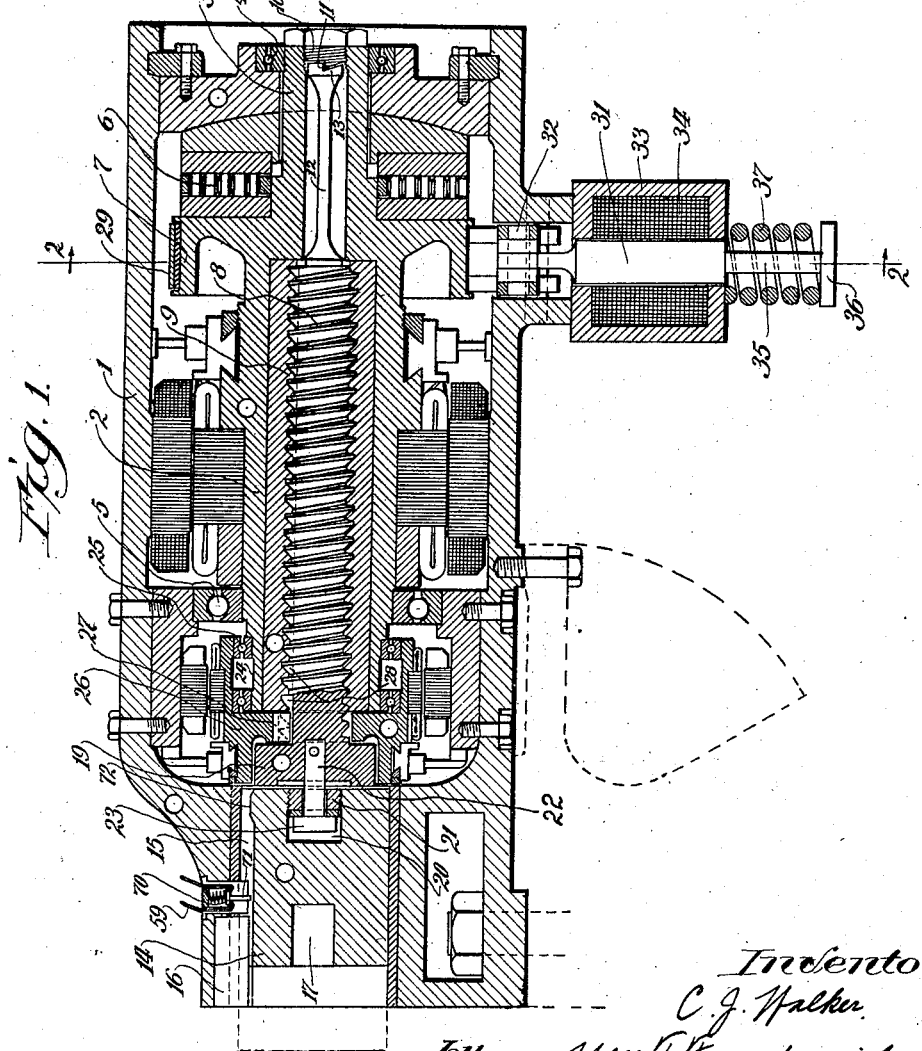
Inventor
C. J. Walker
by Wm. F. Freudenreich Atty Feb. 19, 1924.
C. J. WALKER
1,483,919
ELECTRIC RIVETER
Filed March 31, 1922    2 Sheets-Sheet 2
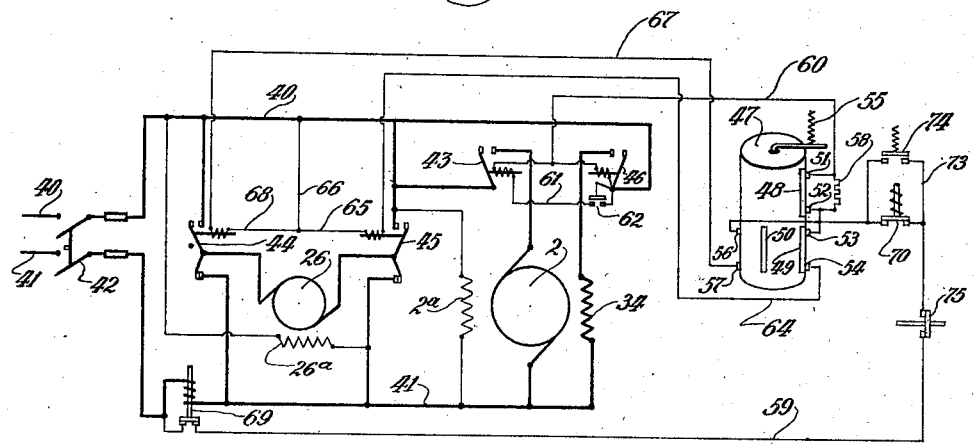
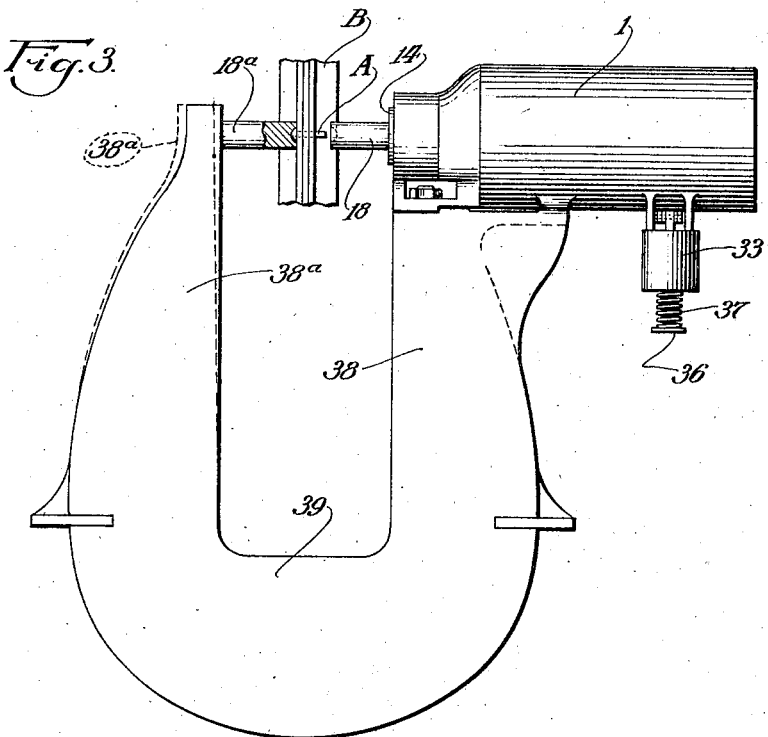
Inventor:
C. J. Walker,
By Wm. F. Frederick, Atty.

Patented Feb. 19, 1924.

1,483,919

UNITED STATES PATENT OFFICE.

CHARLES J. WALKER, OF GARY, INDIANA.

ELECTRIC RIVETER.

Application filed March 31, 1922. Serial No. 548,293.

*To all whom it may concern:*

Be it known that I, CHARLES J. WALKER, a citizen of the United States, residing at Gary, county of Lake, State of Indiana, have invented a certain new and useful Improvement in Electric Riveters, and declare the following to be a full, clear, and exact description of the same, such as will enable others skilled in the art to which it pertains to make and use the same, reference being had to the accompanying drawings, which form a part of this specification.

My invention relates to a machine in which the work of upsetting or driving a rivet is performed by an electric motor in such a way that the total kinetic energy of the rotating element of the motor, that is the fly-wheel effect of the rotating element plus the torque due to the current, is utilized. This can conveniently be accomplished by causing the motor to drive a screw which actuates the movable rivet die or snap. The parts may be so proportioned that before the riveting member meets resistance the motor will be allowed to reach full speed and, as the work of riveting is performed, the motor will be brought to rest; thus absorbing all of the energy made available by the rotating element of the motor. After a rivet has been driven the riveting element and the screw must be retracted. This may be accomplished in various ways. In my prior application Serial No. 210,514, for riveters filed January 5, 1918, I have illustrated a construction in which the screw is non-rotatable, the rotating element of the motor constituting a nut which is rotatable but held against movement in the axial direction. Consequently after a rivet has been driven, the motor must be reversed so as to retract the riveting element and the screw and place them in positions from which to start another riveting stroke. It is obvious that the energy required to drive a rivet is many times greater than that needed to retract the riveting element and the screw. Consequently there is a waste of energy and time whenever the heavy riveting motor has to be reversed simply to retract the riveting element and the screw because this work could be done, not only more quickly by a light motor which will start and accelerate much more rapidly than a heavy motor, but also with the expenditure of much less energy.

The object of the present invention is to produce a simple, novel and efficient electric riveter which will permit a cycle to be completed quickly and without an unnecessary expenditure of energy.

In carrying out my invention, instead of having a non-rotatable main screw, I permit this screw to rotate with the rotating element of the riveting motor, utilizing separate means for holding the screw against rotation during a riveting stroke and returning the screw to the starting point at the end of the riveting stroke, thus leaving for the main motor only the work of actually upsetting or driving the rivets. The auxiliary controlling means for the screw may take various forms and, because the main work is to be done electrically, such means may conveniently be electrical. The arresting of the rotary movement of the screw and the retraction thereof may conveniently be accomplished by the use of a small auxiliary motor keyed to the screw so as to be rotatable therewith and permitting relative movements between the same and the screw in the direction of the axis of the screw; the auxiliary motor running in the same direction and tending to run at the same speed as or a slightly higher speed than the main motor until a riveting stroke is to be started, being arrested or reversed to hold the screw against rotation and, after the rivet has been driven, rotating in the forward direction to retract the screw.

Viewed in another of its aspects, my invention may be said to have for its object to produce a simple and novel construction and arrangement, where an auxiliary motor is used, by means of which the work required to be done by the auxiliary motor during the riveting stroke need consist only in holding together the members of a clutch one member of which is held against rotation and the other of which is carried by the screw, thus making the work of the auxiliary motor comparatively light and insuring that the screw will be firmly held against rotation in either direction.

The simplest kind of a clutch that may be used is a friction clutch one member of which is the ram carrying the riveting die or snap and keyed to the motor casing so as to be non-rotatable, and the other member of which is an enlarged head on the main screw. When the parts finally come to rest at the end of a riveting stroke, the pressure between the faces of the friction clutch will be so great that it will be difficult, if not impossible, for the auxiliary motor to release the clutch. When the riveter is fastened at the free end of one of the arms of the usual yoke at the free end of the other arm of which is located the stationary die or snap, it will be found that the latter arm will have been deflected through an appreciable distance at the end of the riveting stroke or, in other words, that a large amount of energy is stored up in the yoke. If, at this time, the main motor is deenergized, the energy stored up in the yoke is transmitted to the screw in the direction tending to push the screw back to its starting point. There is now nothing to prevent this except the inertia of the stationary rotor of the motor and consequently the powerful thrust of the screw will turn this member backwards. Assuming that the deflection in the yoke has been half an inch and that the pitch of the screw is three-quarters of an inch, it will be seen that the rotating element of the motor must turn backwards two-thirds of a revolution before the deflection in the yoke has been eliminated. The energy stored up in the yoke is very great, however, and as it is suddenly released, it will not only cause the main motor to turn back through two-thirds of a revolution but, because of the momentum acquired by the motor it will continue its backward rotation through perhaps a whole revolution, thus releasing the clutch and permitting the auxiliary motor quickly to retract the screw.

Viewed in another of its aspects, therefore, my invention may be said to have for its object to produce a simple and novel riveting apparatus in which the power stored in the riveting yoke through the deflection of the arms thereof during a riveting stroke may be usefully employed in aiding the riveting mechanism in making the return stroke.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a central longitudinal section taken through my improved riveting machine, a fragment of the yoke to which it is connected in use being shown in dotted lines;

Fig. 2 is a section taken approximately on line 2—2 of Fig. 1;

Fig. 3 is a side elevation on a reduced scale, illustrating the riveting machine in the act of driving a rivet, the deflection which takes place in the yoke during the riveting operation being indicated in dotted lines as though confined to that arm of the yoke carrying the stationary die or snap; and Fig. 4 is a diagram of connections.

Referring to Figs. 1 and 2, 1 represents a motor casing in which there is mounted a rotatable armature 2. The armature has a journal 3 at one end which is mounted in a ball bearing 4 in one end of the casing. A second ball bearing 5 is placed between the casing and the armature, at the opposite end of the armature; the bearings 4 and 5 taking the radial thrust of the armature. The axial thrust of the armature, during the riveting stroke, is borne by a suitable thrust bearing 6 which is conveniently a roller bearing arranged in a plane at right angles to the axis of the armature. The thrust from the armature to the roller bearing is transmitted through a brake drum 7 which is formed integral with the armature quill at the inner end of the journal 3. At the axis of the armature quill is a large screw 8, the quill being interiorly screw threaded as indicated at 9 so as to form a nut co-operating with the screw. If the screw and the armature are rotated relatively to each other, a relative movement in the direction of the length of the screw will result. The journal 3 is made hollow, the outer end being closed by means of a plug 10 having teeth 11 on the inner end. The screw has an extension 12, much smaller in diameter than the body of the screw, extending through the hollow journal and provided on the end with a head having notches 13 adapted to receive the teeth 11. The teeth and the notches are so shaped that when the screw is being turned relatively to the armature in the direction tending to move it toward the plug in the journal, those walls of the notches and faces of the teeth which come in contact with each other extend parallel with the axis of the screw and thus prevent the screw from becoming jammed or wedged into the armature. In other words, the screw can be retracted to a predetermined point and no farther. The long thin stem-like part 12 on the screw serves as a cushion for stopping the screw when it is retracted, since this member will yield somewhat after the notches are engaged with the co-operating teeth, thus interposing a yielding resistance to the turning of the screw and permitting the latter to be brought to rest gradually. In the end of the casing opposite that at which the ball bearing 4 is located is slidably mounted a ram 14; the ram being directly opposite the end of the screw and being movable in the direction of the axis of the screw. In the arrangement shown, the ram is provided with a spline 15 extending longitudinally thereof in the periphery; a key 16 fixed to the casing extending into the spline. The ram is provided with a socket 17 into which may be placed a suitable riveting die or snap such as indicated at 18 in Fig. 3. The ram is considerably larger in diameter than the screw while the adjacent end of the screw is provided with an enlarged head 19. The ram and the enlarged head of the screw are adapted to cooperate with each other to form a friction clutch for at times locking the screw and ram together and thus holding the screw against rotation. The ram is adapted to be driven by the screw in one direction during the riveting stroke and to be retracted by the screw during the return stroke. Therefore the screw and the ram are connected together in any suitable way so as to permit the screw to rotate independently of the ram when the clutch surfaces are not in engagement with each other, only a slight relative movement in the direction of the axis of the screw being permitted. This may be accomplished by forming in the inner end of the ram a pocket 20 closed by means of a plug 21 through which extends a steam or pin 22 arranged axially of and fixed to the screw and provided with a head 23 lying within the pocket behind the member 21. The plug 21 has a thickness less than the distance between the head on the pin or stem and the head on the screw, so that the ram and the screw may be moved relatively to each other through a small distance in the axial direction; being, however, free to rotate independently of each other.

Mounted on an extension 24 of the main armature quill by means of a suitable ball bearing 25, is the armature 26 of an auxiliary motor. The armature of the auxiliary motor extends out beyond the end of the armature of the main motor, so as to surround the head on the screw and a portion of the shank of the screw; and it is provided with a key 27 fitting into a spline which extends lengthwise of the screw. Consequently the armature of the auxiliary motor and the screw are connected together so that they cannot rotate independently of each other, but are left free to move relatively to each other in either direction axially of the screw. The screw may be said to float, because it is not permanently held either against rotation or against endwise movement, being free at times to rotate and also being at times free to move in the direction of its length.

It will be seen that if current is supplied to both of the motors in a direction tending to cause the armatures to rotate in unison with each other in either direction, there is no tendency to move the screw in or out, the screw simply rotating with the armatures. If, on the other hand, a relative rotation between the two armatures is produced, the screw must turn relatively to the main armature. Therefore the motors may be caused to run without any riveting action or the screw may be caused to move in one direction through a riveting stroke or in the other direction through a return stroke, at will. It may be assumed that if the main armature is driven in the clockwise direction as viewed from the left hand of Figure 1, it will move the screw toward the left, that is in the direction of a riveting stroke, if the screw is held against rotation. Therefore in using the machine current may be supplied to both of the motors so as to cause the auxilary armature to tend to travel at least as fast as the main armature, in order to permit the main armature to store up energy which may thereafter be expended in a riveting stroke. When it is desired to drive a rivet the auxiliary motor may be reversed, thus causing the screw to travel quickly toward the left because of the relative rotation between the screw and the main armature. The first result is to bring the head 19 of the screw against the inner end of the ram 14, thus clutching the screw to the ram. By reason of the fact that the radii of the friction surfaces between the screw and the ram are much greater than the radii of the friction surfaces between the screw threads and the main armature no slipping can occur between the screw and the ram but all of the slipping must take place between the co-operating screw threads on the screw and in the main armature. Consequently the screw will be positively held against rotation and will force the ram toward the left to upset or drive the rivet. After the rivet has been driven the ram and the screw may be retracted by again causing the auxiliary motor to run in the forward direction. Because the armature of the auxiliary motor has so little inertia as compared with the armature of the main motor which must have come to rest at the end of the riveting stroke, the small motor will accelerate much more rapidly than the large one and therefore the small motor will actually screw the driving screw back into the main armature. It will therefore be seen that it becomes unnecessary to reverse the main motor in order to retract the screw, the retraction of the screw being effected by means of the small motor which not only consumes less power but acts much more quickly than the large one, thus making the operation of driving rivets less expensive and more rapid than in the case where the main motor has to be reversed after each working stroke in order to complete a return stroke of the riveting means.

The dies or snaps must be held in place for at least a short time after the upsetting or riveting stroke has been completed, in order to permit the rivet to cool sufficiently to prevent it from immediately elongating when the pressure is removed. This can conveniently be accomplished by providing a brake which will lock the main armature against rotation at the end of the riveting stroke so as to hold the dies or snaps closed on the work until the operator sees fit to retract them. In the arrangement shown, there is a suitable brake band 29 placed around the brake drum 7, the free ends of the band being connected together by a pair of toggle links 30. The plunger 31 of a solenoid is connected at one end to the connecting pin 32 between the links of the toggle. The plunger extends slidably through a magnetic shell 33 within which is housed the energizing coil 34. The plunger has a stem 35 extending below the shell and provided with a head 36 on the lower end. Between the head 36 and the bottom of the shell, and surrounding the stem 35, is a strong coiled spring 37 which, when free to do so, exerts a force in the direction to draw the brake band tightly around the drum. When the brake coil 34 is energized the plunger is drawn upwardly, compressing the spring, and releasing the brake.

During the driving or upsetting of a rivet all of the energy stored up in the heavy rotating main armature and that due to the electromagnetic forces tending to rotate the armature must be absorbed, bringing the armature to rest. In Figure 3 I have illustrated the manner of using my improved machine, the same being mounted on the free end of one of the arms 38 of a suitable yoke 39. On the free end of the other arm 38ª of the yoke and aligned with the movable riveting die or snap 18 is a stationary die or snap 18ª. When a rivet A in a piece of work B is formed the pressure between the two arms of the yoke is so great that there will be a considerable deflection. This deflection is represented by the dotted lines in Fig. 3 in connection with the arm 38ª. When the pressure on the rivet is removed the arms of the yoke spring back to their normal positions. However, until the movable die or snap begins to back away from the work, the forces stored up within the yoke and tending to return the arms to their normal positions are transmitted all the way back to the thrust bearing at the right hand end of the main armature, one of the links in this chain of pressure transmission being the friction clutch between the screw and the ram. In other words, the members of this clutch are being held together under great pressure and, unless assisted, the small auxiliary motor would not be powerful enough to release the clutch so as to permit the screw to be turned to retract it. However, I am able to utilize this very thrust that holds the clutch elements together in such a manner as to bring about a separation of the clutch faces and permit the small motor to perform the work of retracting the screw. The instant the brake is released the tendency of the screw to turn the main armature backward is permitted to become effective and the main armature is actually driven backwards by the screw. The main armature gathers momentum sufficient to cause it to continue to move backward for some distance after the pressure exerted by the screw has ceased. The first portion of the backward movement of the main armature will permit the screw to recede a distance equal to the deflection which took place in the yoke and then the additional travel of the armature due to the acquired momentum, will draw the screw away from the ram, at least sufficiently to relieve the pressure between the ram and the screw to a point where the auxiliary motor becomes free to exert its turning influence on the screw. Therefore, if at the instant that the brake is released current is supplied to both motors in the direction for normal running while preparing for a riveting stroke, the main armature will be momentarily checked and actually driven back; but, as soon as the pressure at the clutch is relieved, the small motor will quickly accelerate and even though the main armature quickly begins to rotate under the influence of the current imposed on it the auxiliary motor will be able to rotate the screw relatively to the main armature through a sufficient number of turns completely to retract it. In other words, the auxiliary motor will cause the retraction of the screw during about the time, or even less, that it takes the large motor to accelerate to a normal running speed.

The operation of the machine may perhaps be best understood by referring to the wiring diagram which is Fig. 4 of the drawings. Referring to this diagram 40 and 41 represent the main line conductors while 42 is the main circuit controlling switch. The motors are illustrated as being shunt wound, the main motor having a field coil 2ª and the auxiliary motor having a field coil 26ª connected directly across the line. The circuit through the main armature is controlled by any suitable electromagnetic controller represented in the drawing by a simple electromagnetic switch 43. The circuit through the armature of the auxiliary motor is controlled by a suitable reversing switch mechanism which will permit the current to be passed through the armature in either direction. In the arrangement shown, there are two electromagnetic switches 44 and 45. The circuit through the brake coil 34 is controlled by a suitable electromagnetic switch 46. The switches 43, 44, 45 and 46 are controlled by a manual controller illustrated as taking the form of a drum 47 having thereon two contact pieces 48 and 49 aligned longitudinally of the drum and separated from each other, together with another contact piece 50 displaced from the contact pieces 48 and 49 angularly of the drum. In one position of the drum the contact piece 48 is adapted to engage and connect together two contact fingers 51 and 52, while the contact piece 49 engages and connects together electrically two contact fingers 53 and 54. A spring 55 acting on the drum tends constantly to hold the drum in the position in which the contact pieces 48 and 49 engage with their co-operating contact fingers. When the drum is turned against the resistance of the spring, the control circuits are interrupted at the contact fingers 51 to 54 and the contact piece 50 engages with and electrically connects together two contact fingers 56 and 57. A resistance 58 is connected between the contact fingers 51 and 52.

Assuming that the main switch 42 is closed and that the controller occupies the position illustrated in the drawing, it will be seen that current flows from the main line 41 through a wire 59 to the contact fingers 52 and 53. From the contact finger 52 current flows to the contact piece 48, the finger 51 and wire 60 through the actuating coil for the brake switch 46 and thence to the main line 40. A branch from the wire 60 leads to one terminal of the actuating coil for the main armature switch, the other terminal of this coil being connected by a wire 61 to the main line 40. In the line 61 is a switch 62 connected with the brake switch so as to open when the brake switch opens and close when the brake switch closes. Therefore it is necessary for the brake switch to be closed, whereby the brake releasing coil will be energized, before current will be delivered to the main armature. A wire 64 leads from the contact finger 54 to one terminal of the actuating coil for the reversing switch 45 of the auxiliary motor, the other terminal of this coil being connected to the main line 40 through wires 65 and 66. Therefore current will be caused to flow through the armature of the auxiliary motor which had theretofore been short circuited upon itself; the current flowing in such direction that the armature will rotate in the same direction as the main armature. The two armatures may be allowed to run indefinitely until it is desired to drive a rivet, the armatures reaching their maximum speed so as to store up the maximum amount of energy in the main armature. When it is desired to drive a rivet the controller is turned into its second position in which the contact 50 bridges the contact fingers 56 and 57, the circuits at the other four contact fingers being interrupted. It will be seen that when the contact piece 48 leaves the contact fingers 51 and 52 current will still be delivered to the coils of the brake switch and the main armature switch, passing, however, through the resistance 58 which reduces the current to a point sufficient to hold the switches 43 and 46 closed but insufficient again to close the same after the switches have been opened. The current to the actuating coil of the switch 45 is interrupted, however, so that this switch assumes the position shown in the drawing. When the contact piece 50 bridges the fingers 56 and 57 current flows from the wire 59 through the finger 56, the contact piece 50 and finger 57 to a wire 67 connected to one terminal of the actuating coil for the switch 44 associated with the auxiliary motor. The other terminal of this coil is connected to the wire 66 by a wire 68. Current will now flow through the armature of the auxiliary motor in the opposite direction from that in which it previously flowed. The net result of shifting the controlling switch, up to this point, is therefore to leave the main motor unaffected, but to reverse the auxiliary motor. Consequently the main driving screw which had theretofore been rotating with the two armatures is brought to rest and perhaps turned backwards through a fraction of a turn by the auxiliary motor. At any rate, the effect is to cause the main armature to rotate relatively to the screw and therefore cause the screw to move axially until it engages with the ram. Thereafter the screw and the ram move through a riveting stroke in unison with each other, as heretofore explained and, as the work of riveting is done, the total energy due to the fly wheel effect of the main armature and the torque, is absorbed and the main armature brought to rest. As the main armature comes to rest the current flowing through the same is greatly increased, causing an overload switch 69 in the control line 59 to be opened; the actuating coil for this overload switch being in series with the main armature. The breaking of the control circuit causes the actuating coils for the switches 43, 44 and 46 to become deenergized, these switches assuming the positions shown in the drawing. In other words, the armature circuit for the main motor will be opened, the armature for the auxiliary motor will be short-circuited on itself, and the brake coil will be deenergized so as to permit the actuating spring for the brake to apply the brake. Therefore, as long as the operator holds the control switch in what may be termed the riveting position, the brake, acting through the quill of the main motor armature, and through the screw and the ram, will hold the riveting dies or snaps clamped on the work; thus permitting the rivet to cool and set. When the circuit through the main armature is interrupted, the overload switch again closes but, as heretofore explained, sufficient current cannot flow through the control circuit while the resistance 58 is in again to close the switches 43 and 46.

When the operator lets go of the controller handle, the drum flies back to the position shown in the drawing, simultaneously energizing the armature of the auxiliary motor and the brake coil, so that the auxiliary armature immediately tends to begin what may be termed forward rotation and the main armature is left free to rotate. Instantly the enormous energy stored in the yoke of the riveting machine is exerted to push the screw back into the main armature and thus force the main armature to turn backwards as heretofore explained; thereby releasing the clutch and permitting the auxiliary armature to turn the screw. A slight interval of time elapses between the closing of the brake switch and the main armature switch, so that at the instant that the energy stored in the yoke reacts on the screw the main armature may be functioning simply as a heavy free rotatable mass because no current is flowing through the armature. In any event, the auxiliary armature begins to turn in the forward direction at least as soon as the main armature and, because it accelerates much more rapidly than the main armature and also because it preferably tends to run at a somewhat higher speed than the large armature, the screw will be turned more rapidly than the large armature until it has been completely retracted so that the two armatures and the screw must rotate in unison.

It will therefore be seen that the main armature is brought to rest at only one point in the cycle of operations, namely between the riveting and the return stroke whereas, if the main armature has to be reversed to retract the screw it must be brought to rest at the end of the riveting operation and also at the end of the retracting stroke and, at the end of the retracting stroke, must accelerate from a position of rest before sufficient energy can be stored up effectively to perform a second riveting stroke. In my improved construction, on the other hand, whenever the main armature is accelerated from a position of rest it is storing up energy which will not be wasted in useless stopping of the armature but becomes immediately available for doing useful work.

In order to prevent the ram from being driven out too far I have provided a safety device which, as best shown in Fig. 1, comprises a switch 70 mounted in that portion of the casing surrounding the ram and having a radially movable actuating stem 71 projecting down into the keyway or spline 15. In the bottom of the spline, near the inner end thereof is a hump 72 which, in the event that the ram is driven out too far, will engage with the actuating member 71 of the safety switch and move the same outwardly so as to open the circuit. The control wire 59 passes through this safety switch so that when the switch is open the control circuits are also open. If desired, a shunt 73 containing a normally-open switch 74 may be placed around the safety switch so as to permit the operator to close the control circuits even though the safety switch be open. Also, if desired, a controlling switch 75 may be placed anywhere in the control circuit to permit the same to be rendered inoperative at will.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In an electric riveting machine, a riveting member, a rotatable electric motor element, mechanism between said element and said member for driving the latter through a working stroke with the total kinetic energy available in the rotating motor element, in bringing the latter to rest from a condition of motion, and additional means for restoring said member and said mechanism to positions in which they are ready to begin another working stroke.

2. In an electric riveting machine, a riveting member adapted to operate through a cycle comprising a working stroke and a return stroke, a rotatable electric motor element, means for translating the rotation of said element into a working stroke of said member, and causing said member and said element to come to rest simultaneously at the end of a working stroke, and additional means for driving said member through a return stroke.

3. In an electric riveting machine, a riveting member, a rotatable electric motor element, means for translating a plurality of revolutions of said element into a working stroke of said member, and causing said member and said element simultaneously to come to rest at the end of a working stroke, and additional means for moving said member through a return stroke.

4. In an electric riveting machine, a riveting member, a rotatable motor element, mechanism for transmitting the kinetic energy yielded by said element in slowing down to a position of rest to said member to carry the latter through a working stroke, and additional means acting on said mechanism and on said member to return the same to positions in which they are ready to begin a second working stroke.

5. In an electric riveting machine, a riveting member, a rotatable motor element, mechanism between said member and said element for driving said member through a working stroke with all of the energy yielded by said element in checking its rotation so as to bring it to rest, and additional means acting on said member and on said mechanism to move the same through a return stroke.

6. In an electric riveting machine, a screw-threaded riveting member, a rotatable motor element connected to said member to move the latter in the direction of its length when they are rotated relatively to each other, and means acting on said member to produce relative rotation between the same and the motor element in either direction while the motor element is rotating in a single direction.

7. In an electric riveting machine, a rivet-driving screw, a rotatable motor element connected to said screw in such a manner that the screw is moved in the direction of its length when there is relative rotation between the motor element and the screw, and means acting on the screw to bring about relative rotation in opposite directions between the same and the motor element while the latter is rotating in one direction and thereby cause the riveting screw to be reciprocated.

8. In an electric riveting machine, a reciprocable rivet-driving screw, a motor adapted to be supplied with current tending to rotate the movable motor element in one direction only, connecting means between said motor element and said screw adapted to cause the screw to be driven by said element through a working stroke when the screw and the motor element are rotated relatively to each other in one direction, and means acting on the screw to cause either such a relative rotation or a relative rotation in the opposite direction.

9. In an electric riveting machine, a rivet-driving screw, a rotatable motor element connected to the screw so as to drive it through a working stroke when they rotate relatively in one direction while the motor element rotates in a predetermined direction, and means acting on said screw to cause the aforesaid relative rotation or to cause a relative rotation in the opposite direction while the motor element rotates in the aforesaid predetermined direction.

10. In an electric riveting machine, a rotatable motor element, a floating rivet-driving screw arranged at the axis of said element and in screw-threaded relation thereto, and means for holding the screw against rotation to cause it to be moved lengthwise through a working stroke by said element.

11. In an electric riveting machine, a rotatable motor element, a floating rivet-driving screw arranged at the axis of said element and in screw-threaded relation thereto, and means for holding the screw so as to cause it to be moved lengthwise by the rotating motor element through a working stroke, or for turning the screw in the same direction as and more rapidly than said motor element to cause the screw to be retracted.

12. In an electric riveting machine, a rotatable motor element, a floating rivet-driving screw arranged at the axis of and in screw-threaded relation to said element, a ram supported beyond one end of the screw so as to be slidable in the direction of the length of the screw and be held against rotation about the axis of the screw, and means for clutching the screw to the ram in order to hold it against rotation during a working stroke.

13. In an electric riveting machine, a rotatable motor element, a floating rivet-driving screw arranged at the axis of and in screw threaded relation to said element, a ram supported beyond one end of the screw so as to be slidable in the direction of the length of the screw and be held against rotation about the axis of the screw, and means co-operating with the screw to clutch it to the ram during a working stroke and to rotate it more rapidly than and in the same direction as said motor element to effect a return stroke.

14. In an electric riveting machine, a main rotatable motor element, a rivet-driving screw arranged at the axis of said element and in screw-threaded relation therewith, and an auxiliary rotatable motor element keyed to the screw so as to be rotatable therewith but permitting the screw to move axially thereof.

15. In an electric riveting machine, a main rotatable motor element, a rivet-driving screw arranged at the axis of said element and in screw-threaded relation therewith, an auxiliary rotatable motor element keyed to the screw so as to be rotatable therewith but permitting the screw to move axially thereof, means for energizing the main motor element so as to cause it to tend to rotate in one direction only, and means for energizing the auxiliary motor element for rotation in either direction.

16. In an electric riveting machine, a rotatable main motor element, a screw arranged at the axis of and in screw-threaded relation to said element, a non-rotatable ram arranged beyond one end of the screw and slidable in the direction of the length of the screw, the adjacent ends of the screw and ram serving as co-operating friction-clutch faces, and an auxiliary rotatable motor element keyed to the screw so as to be rotatable therewith but permitting the screw to move axially thereof.

17. In an electric riveting machine, a rotatable main motor element, a screw arranged at the axis of and in screw-threaded relation to said element, a non-rotatable ram arranged beyond one end of the screw and slidable in the direction of the length of the screw, the adjacent ends of the screw and ram serving as co-operating friction-clutch faces, an auxiliary rotatable motor element keyed to the screw so as to be rotatable therewith but permitting the screw to move axially thereof, means for energizing the said main motor element to cause it to rotate in a direction which will move the screw through a working stroke when the screw is held against rotation, and means for energizing the auxiliary motor element for rotation in either direction.

18. In an electric riveting machine, a rotatable main motor element, a screw arranged at the axis of and in screw-threaded relation to said element, a non-rotatable ram arranged beyond one end of the screw and slidable in the direction of the length of the screw, the adjacent ends of the screw and ram serving as co-operating friction-clutch faces, an auxiliary rotatable motor element keyed to the screw so as to be rotatable therewith but permitting the screw to move axially thereof, a brake for said main motor element, an electric circuit for said main motor element containing a switch, and means controlled by the current in said circuit for opening the same and applying the brake.

19. In a riveting machine, a rotatable main motor element and a rotatable auxiliary motor element co-axial with each other, a screw arranged at the axis of said elements and in screw threaded relation to the main motor element, a key connection between the screw and the auxiliary motor element whereby the screw is adapted to move axially of the auxiliary element but is rotatable therewith, and a control system arranged to energize said motor elements to cause them to revolve in the same direction to retract the screw and store up energy and to tend to revolve in opposite directions to drive the screw through a working stroke.

20. In a riveting machine, a rotatable main motor element and a rotatable auxiliary motor element co-axial with each other, a screw arranged at the axis of said elements and in screw-threaded relation to the main motor element, a key connection between the screw and the auxiliary motor element whereby the screw is adapted to move axially of the auxiliary element but is rotatable therewith, a brake for said main motor element, and a control system constructed and arranged first to release the brake and energize both of said motor elements for rotation in the same direction and then to energize the auxiliary element for rotation in the opposite direction.

21. In a riveting machine, a rotatable main motor element and a rotatable auxiliary motor element co-axial with each other, a screw arranged at the axis of said elements and in screw-threaded relation to the main motor element, a key connection between the screw and the auxiliary motor element whereby the screw is adapted to move axially of the auxiliary element but is rotatable therewith, a brake for said main motor element, a control system constructed and arranged first to release the brake and energize both of said motor elements for rotation in the same direction and then to energize the auxiliary motor element for rotation in the opposite direction, and an overload switch controlled by the current flowing through said main motor element for deenergizing both of said motor elements.

22. In combination, a yoke adapted to straddle work to be riveted, an electric riveting machine attached to one arm of the yoke and containing a rotating driving motor element and a clutch, and means adapted to be operated by the rebound of the arms of the yoke when the riveting pressure is removed to control said clutch.

23. In a machine of the character described, a rotatable motor element, a screw arranged axially of and in screw-threaded relation to said element, interlocking shoulders between one end of the screw and said element adapted to engage with each other along lines extending parallel with the axis of the screw when the screw is at one limit of its travel.

24. In a machine of the character described, a rotatable motor element, a screw arranged axially of and in screw-threaded relation to said element, interlocking shoulders between one end of the screw and said element adapted to engage with each other along lines extending parallel with the axis of the screw when the screw is at one limit of its travel, said screw having an elongated attenuated stem between the said shoulders thereon and the body of the screw.

25. In a machine of the character described, a rotatable motor element, a screw arranged axially of and in screw-threaded relation to said element, interlocking shoulders between one end of the screw and said element adapted to engage with each other along lines extending parallel with the axis of the screw when the screw is at one limit of its travel, said screw having a yielding section adapted to absorb the shock of the blow when said shoulders are brought together.

In testimony whereof I sign this specification.

CHARLES J. WALKER.